(No Model.)

E. W. PRATT.
HINGE FOR COOKING UTENSILS, &c.

No. 576,887. Patented Feb. 9, 1897.

WITNESSES:
Edw. Thorpe
J. Fred. Acker

INVENTOR
E. W. Pratt.
By
ATTORNEYS.

UNITED STATES PATENT OFFICE.

EBER W. PRATT, OF IPAVA, ILLINOIS, ASSIGNOR OF ONE-HALF TO GEORGE W. GLORE, OF SAME PLACE.

HINGE FOR COOKING UTENSILS, &c.

SPECIFICATION forming part of Letters Patent No. 576,887, dated February 9, 1897.

Application filed March 20, 1896. Serial No. 584,056. (No model.)

*To all whom it may concern:*

Be it known that I, EBER W. PRATT, of Ipava, in the county of Fulton and State of Illinois, have invented a new and Improved Hinge for Cooking Utensils and Like Vessels, of which the following is a full, clear, and exact description.

The object of the invention is to provide a hinge especially adapted for attachment to the covers of pots, skillets, stew-pans, &c., and which is capable of being expeditiously and conveniently secured to the pot or to the body of the utensil to which the cover is adapted to be fitted, the hinge being so constructed that the cover may be closed over the body of said utensil in a thoroughly tight manner, and whereby also the cover may be raised to an upright position, disclosing the interior of the body of the utensil, and held in such upright position in an automatic manner, thus serving to prevent the cook or handler of the utensil from burning the fingers in removing the lid or cover.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1:
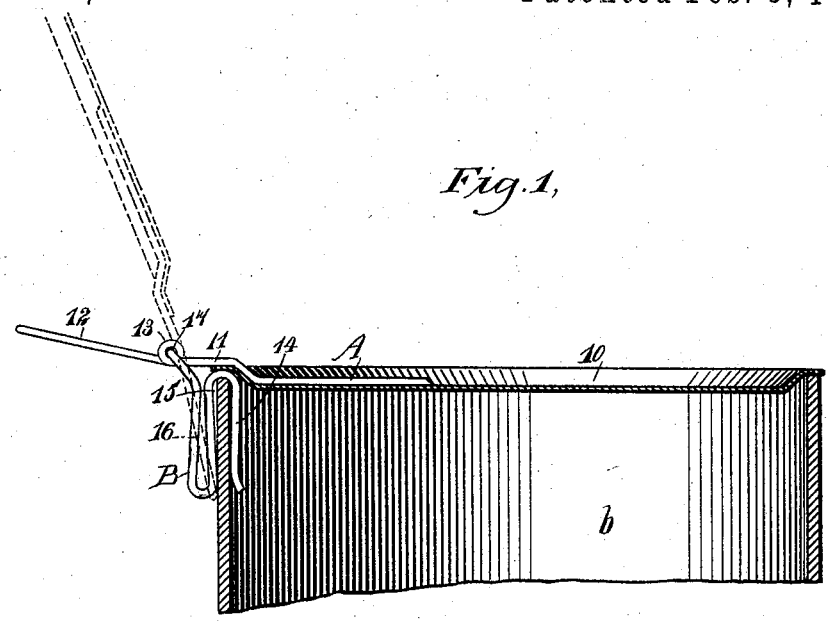
Figure 2:
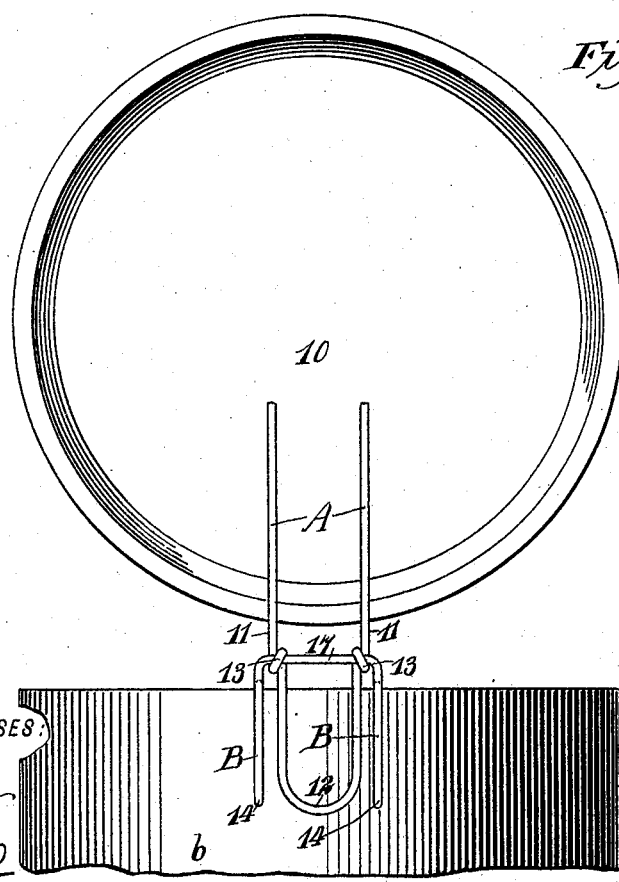

Figure 1 is a vertical section through a cover having the improved hinge applied, the hinge being shown in side elevation, and a portion of the body of the utensil to which the cover pertains being also shown in vertical section, and said Fig. 1 also illustrates the position of the hinge in dotted lines when it is raised to carry the cover from over the body of the utensil; and Fig. 2 is a side elevation of a portion of the body of the utensil, the hinge being shown in rear elevation as applied to the said body and the cover to which the hinge is attached being illustrated in an upright position.

In carrying out the invention the cover 10 is provided with a hinge constructed in two sections A and B. The section A, which is the upper section, is attached directly to the cover, preferably at the top, and is constructed preferably of a stout wire which is bent upon itself to form two members, the said members being secured at their inner ends positively to the cover. The members of the upper section A of the hinge are provided with a horizontal section 11, which extends a predetermined distance over and beyond the margin of the cover, and the outer portion of the aforesaid upper section of the hinge forms a substantially bow-section 12, and where the bow-section connects with the horizontal section 11 of the aforesaid upper hinge member an eye 13 is formed in each of said members, usually by bending the wire upon itself prior to the formation of either the horizontal section 11 or the bow-section 12.

The lower section B of the hinge is a clamping-section, being adapted for attachment to the body $b$ of the utensil. The lower section of the hinge is of substantially yoke construction, and its vertical portions comprise, preferably, three members 14, 15, and 16, produced by returning the wire of which this section is made upon itself, whereby the members 14, 15, and 16 will be substantially parallel; but the lower extremity of the innermost member 14 is made to depart to a predetermined extent from the intermediate member 15, and the upper portion of the outer member 16 is preferably made to approach somewhat closely the intermediate member 15. The bow member 17, connecting the vertical portions comprising the aforesaid members 14, 15, and 16, is carried outward at an angle to the outer side member 16, as is particularly shown in Fig. 1, and is given an upward as well as an outward inclination, and the bow member of the bracket-section B of the hinge is made to pass through the eyes 13 of the upper section A, which is attached to the cover; and when the cover is to be applied to the body $b$ of a receptacle the said body of the receptacle or utensil is received between the inner side member 14 and intermediate member 15, as is shown particularly in Fig. 1. In this manner the cover is removably attached to the body of the utensil.

In operation when the cover is closed over the utensil, as shown in positive lines in Fig. 1, the connecting or bow section of the bracket B will rest loosely in the eyes 13 of the upper section of the hinge, and owing to the outward inclination of the connecting or bow member 17 of the bracket portion of the hinge when the lid is raised, which is accomplished by exerting downward pressure upon the bow extension 12 of the upper hinge member A, the bow or connecting portion 17 of the lower or bracket section B of the hinge will so bind against the eyes 13 of the upper section as to hold the lid in an upright position in the event that the cover is carried to a perpendicular position; but the cover may be carried to the outward-inclined position shown in dotted lines in Fig. 1, and in this instance the cover, being carried over the center of its axis, will remain of itself in the open position in which it is placed.

Having thus described my invention, I claim as new and desire to secure by Letters Patent—

1. A hinge for the covers of receptacles, comprising an upper section having its inner end adapted for attachment to a cover, the said section being constructed to extend outwardly beyond the margin of the cover forming a handle, and bearings formed in the said section between its outer end and the portion attached to the cover, and a lower or bracket section having a horizontal member adapted to engage the bearings on the upper section, and vertically-arranged clamping members adapted for engagement with the body of the receptacle, the handle portion of the upper section of the hinge being adapted to engage the outer side of the receptacle to hold the lid in the raised position as and for the purpose specified.

2. A hinge for the covers of receptacles or utensils, comprising an upper section consisting of a wire bent upon itself forming substantially parallel members, the inner ends of the members being adapted for attachment to a cover, the bent portion of said wire extending beyond the margin of the cover forming a handle, and an eye formed in each of the members of the said section between the outer end or handle and the portion adapted to be secured to the cover, and a lower section consisting of a wire bent upon itself to form side members arranged to clamp the body of the utensil, and a substantially horizontal member connecting the vertical members and journaled in the eyes of the upper section, as and for the purpose specified.

3. The combination, with a cover, of a hinge comprising an upper section and a lower or bracket section, the upper section having its inner end secured to the cover, extending over and beyond the margin of the cover in a substantially horizontal direction, the extreme outer portion of the upper section of the hinge being formed as a handle, and said section being further provided with eyes between the handle and the horizontal section extending over the margin of the cover, the lower section of the hinge comprising spring-returned side members arranged to clamp the body of the utensil, and an upper connecting bow member having an upward and rearward inclination and journaled in the bearings of the upper portion of the aforesaid hinge, as and for the purpose specified.

4. The combination, with the cover of a receptacle or utensil, and a wire bent upon itself to form substantially parallel members, the inner ends of the members of the wire being secured to the said cover, extending horizontally beyond the margin of the same and thence upwardly forming a handle, bearings being formed in the wire between the handle and that portion of the wire members which is carried over the margin of the cover, of a bracket constructed of a spring material, comprising side members returned upon themselves, forming vertical loops, and an upper connecting or bow member uniting the side members, being journaled in the bearings of the wire section attached to the aforesaid cover, as and for the purpose specified.

EBER W. PRATT.

Witnesses:
W. A. BABCOCK,
J. A. MORRISON.